Feb. 28, 1967 E. DA CRUZ 3,306,462

STORAGE CASE FOR DISK-SHAPED OBJECTS

Filed March 31, 1965 2 Sheets-Sheet 1

INVENTOR
EDWARD DA CRUZ
BY Robert H. Ware
ATTORNEY

Feb. 28, 1967 E. DA CRUZ 3,306,462
STORAGE CASE FOR DISK-SHAPED OBJECTS
Filed March 31, 1965 2 Sheets-Sheet 2

INVENTOR
EDWARD DACRUZ
BY
Robert H. Ware
ATTORNEY

United States Patent Office 3,306,462

Patented Feb. 28, 1967

3,306,462

STORAGE CASE FOR DISK-SHAPED OBJECTS

Edward da Cruz, Bethel, Conn.
(87 Beaverbrook Road, Danbury, Conn. 06810)

Filed Mar. 31, 1965, Ser. No. 444,171
8 Claims. (Cl. 211—49)

This invention relates to a combined storage case and rack for disk-shaped objects, and particularly to a combination rack-tray for poker chips.

Conventional poker chip trays and cases generally fail to position the stored chips in a convenient array, and fail to hold them in an upright stacked array for convenient withdrawal and re-insertion of the chips.

By contrast, the cases of the present invention provide convenient racked storage for poker chips, maintaining them in upright stacked arrays for highly convenient withdrawal and re-insertion.

Accordingly, a principal object of the invention is to provide a combined case and rack for the storage of disk-shaped objects such as poker chips capable of maintaining the stored objects in convenient stacked arrays.

Another object of the invention is to provide such storage cases capable of maintaining the stored objects in their stacked condition when the case rests on its bottom and also when the case rests on its side.

A further object of the invention is to provide such storage cases capable of maintaining one or a plurality of disk-shaped objects in suspended, vertically-stacked array for convenient withdrawal by the user.

Other and more specific objects will be apparent from the features, elements, combinations and operating procedures disclosed in the following detailed description and shown in the drawings, in which.

Figure 1:
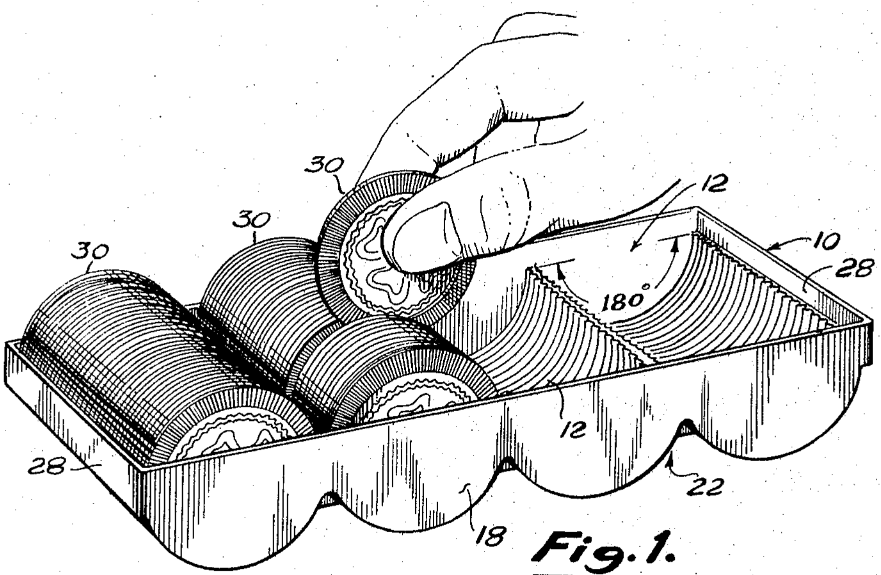
FIGURE 1 is a perspective view of a storage case embodying the preferred features of the present invention.
Figure 3:
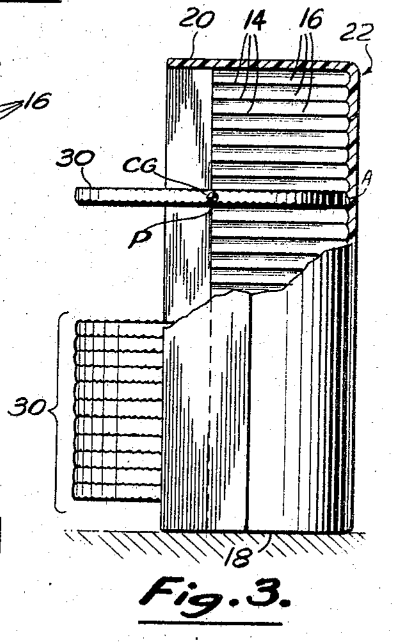
FIGURE 3 is an end elevation view of the case of FIGURES 1 and 2, shown resting on its front face.

The rigid lightweight cases of the present invention are unusually stiff and strong, offering sturdy support for stored disk-shaped objects, such as poker chips. In addition, the cases of this invention as shown in the drawings are uniquely adapted to contain stored poker chips in arrayed stacks, positioned either with their axes horizontal and the chips arrayed side by side, as shown in FIGURE 1, or with their axes vertical and the chips positioned one above the other as shown in FIGURE 3. In this vertically-stacked position, one or more chips are independently suspended in the storage rack cavities of the cases of this invention and they are thus made available for convenient withdrawal by the user.

*Grooved rack cavities*

The case 10 shown in the figures accommodates 100 stacked poker chips in four equal stacks of 25 chips each. These four stacks are placed in four semi-cylindrical, concave rack-cavities 12. As shown in the figures, each cavity 12 is a concave cavity shaped substantially in the form of one half of a right circular cylinder, of which the generating curve or "generatrix" is a semi-circle.

The curved wall forming the bottom and sides of each cavity 12 is provided with a plurality of inwardly-protruding, convex ribs 14 extending around its periphery in planes transverse to the axis of the cylinder. These ribs 14 thus form between themselves a corresponding plurality of concavely dished peripheral grooves 16 extending around the entire curved wall of each cavity 12. In the illustrated embodiment of the invention there are 25 such grooves formed by twenty-three convex ribs 14.

While the means forming the cavities 12 may be varied to suit the other requirements of the user, the illustrated embodiment of the invention incorporates a front wall 18 and a rear wall 20 respectively forming the front end and the rear end of each of the cavities 12, which are arrayed side by side to form a rectangular case. The bottom 22 of the case 10 is thus provided with a shaped upper surface forming the cavities 12 with the grooves 16 formed between the convex ribs 14, and the lower surface of bottom 22 of the case 10 is shaped in any manner desired. In the illustrated embodiment this lower surface of bottom 22 conforms closely to the upper surface forming the cavities 12, and is therefore shaped in a series of convex lobes 24 formed as segments of right circular cylinders, each of which is coaxial with one of the semi-cylindrical cavities 12. Strengthening ribs 26 span the spaces between the lobes 24 to form reinforcing flanges providing sturdy support for the case 10.

As shown in the drawings, the adjoining lobes 24 intersect along axial lines 25 and the terminal lobes 24 form the ends of the case 10, with an end wall 28 extending from the peripheral edge of each outermost lobe 24 to join the upper edge of front wall 18 with rear wall 20 at each end of case 10.

Figure 5:
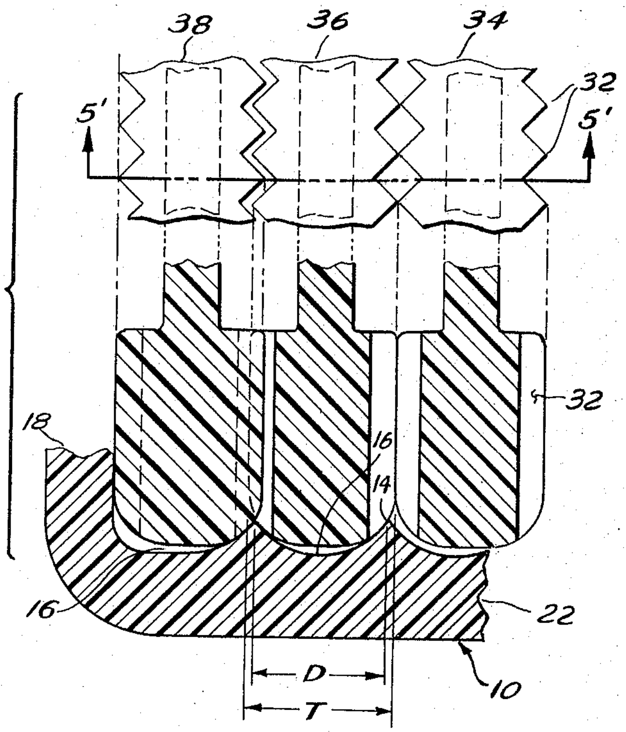
FIGURE 5 is a fragmentary sectional view, greatly enlarged, of the case and stored objects of the previous figures.

As shown in FIGURES 3 and 5, each concave groove 16 receives and embraces the rim of one of the disks 30 stored in the case 10. The disks 30 have a maximum outside diameter slightly less than the corresponding inside diameter of each groove 16, but greater than the comparable inside diameter of the ribs 14 flanking each groove 16. This dimensional relationship produces important advantages of the cases of this invention, for the stacked chips are maintained either as horizontal stacks or as vertical stacks, without becoming disarranged.

*Vertical or horizontal storage*

Figure 2:
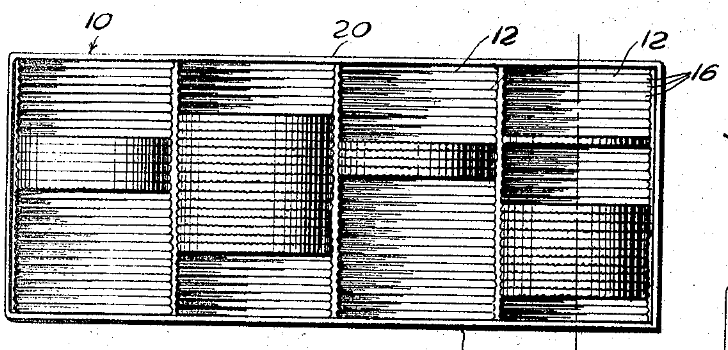
FIGURE 2 is a top plan view of the case shown in FIGURE 1.

In the horizontal stack position of FIGURE 1, each of the stored chips is supported upright in its own individual semi-circular grooved rack, presenting the entire stack of 25 chips for convenient removal, while maintaining in the same upright array all partial stacks of chips not yet removed from the case, as indicated in FIGURE 2.

In addition, the semi-circular grooves 16 support the individual chips separately when the case is upended to rest upon its front wall 16, as shown in the enlarged view of FIGURE 3, thus presenting single chips and whole or partial stacks of chips for convenient withdrawal by the user, as indicated in FIGURE 3. In this vertically-stacked position, each individual chip is suspended between and supported by the underlying ribs 14 defining its individual grooves 16 as shown in FIGURE 3, and it will be seen that the center of gravity C.G. of each individual disk 30 is thus suspended between the terminal points P of its underlying semi-circular rib 14.

*Rack angles*

The generally semi-circular ribs 14 and grooves 16 extend around the curved wall of cavity 12 for a "rack angle" of substantially 180° or half of the complete circle from which they are formed, thus assuring that the center of gravity of each individual disk 30 will be suspended between opposite terminal points of the semi-circular rib 14 as indicated in the enlarged view of FIGURE 3. The peripheral point A on disk 30, half way between these two terminal points of rib 14, which is confined within the groove 16 will thus be embraced between two supporting ribs 14. Any tendency of the disk 30 to tip forward out of its groove 16 will be counteracted by the upper rib 14 bearing against the peripheral point A of the disk 30, as indicated in FIGURE 3.

Figure 4:
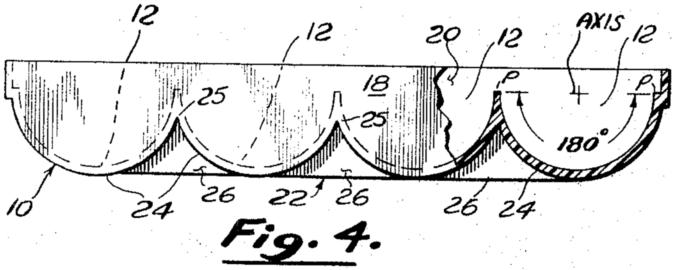
FIGURE 4 is a front face elevation view of the case of FIGURE 2.

The rack angle through which the curved wall of each cavity 12 extends, shown as 180° in FIGURES 1 and 4, may vary to some extent, depending upon the comparative dimensions and tolerances of the disks 30, ribs 14 and grooves 16. A rack angle less than 170° to 175° will generally fail to provide the supported equilibrium of horizontal chips shown in FIGURE 3, although lesser rack angles permit adequate support of the vertical chips shown in FIGURE 1. Rack angles exceeding 185° to 190° reduce the portal width of groove 16, and unless this width matches or exceeds the outside diameter of disk 30, the disks can be inserted and withdrawn only by forcing them past the points P,P. The elasticity of the case material thus limits the maximum rack angle which can be employed.

*Self-aligning disks*

Figure 6:
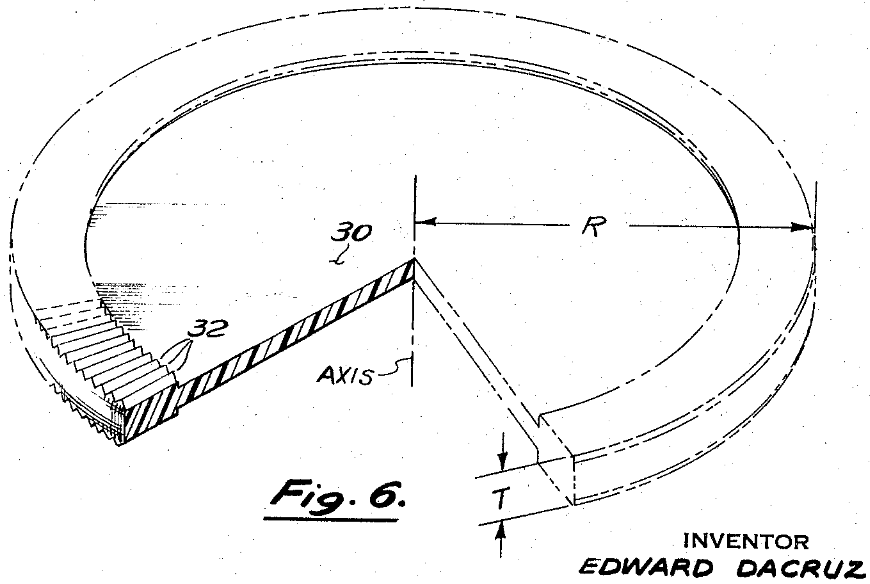
FIGURE 6 is an enlarged perspective view of a poker chip incorporating a serrated interlocking rim, employed in one embodiment of the invention, shown in partial section to illustrate the structural details thereof.

As shown in FIGURES 5 and 6, the disks 30 preferably employed in the cases of this invention are provided with alignment means around their rims comprising regular serrated ridges 32 engageable with similar ridges 32 on adjacent disks 30.

These may be regular wavy, undulating or V-shaped ridges arranged in a radial pattern (FIGURE 6) or in a crossing configuration forming a "knurled" pattern (not shown). Each disk can engage its neighbor to produce automatic self-alignment of the juxtaposed plurality of chips, because the ridges 32 form a reversible pattern symmetrical about the axis of each disk, and mutually engageable by slight pivoting adjustment.

For example, a stack of chips each of 0.105″ maximum thickness with valleys 0.020″ deep between alignment ridges 32 will have a minimum rim thickness of 0.065″. Thus a stack of 25 such chips normally standing 2.625″ can be substantially "compressed" as the chips are aligned with their facing surfaces inter-engaged, and axial misalignment is eliminated when the alignment means 32 of the stacked chips are all engaged.

Thus chips 34 and 36 are disengaged in FIGURE 5, freeing chip 34 for separate removal. Chips 36 and 38 are engaged, axially aligned and closely juxtaposed, each supported in its groove 16. The resulting "compressibility" of the stack of engaged chips facilitates their withdrawal as whole or partial stacks by the user. Similarly, the center-to-center distance D between ribs 14 may thus be less than the thickness T of disks 30, as shown in FIGURE 5.

In addition, as shown in FIGURE 1, a chip may be inserted centrally within an arrayed group of chips, forcing one end sub-stack of engaged chips to slide up the sides of their grooves 16 to "hop" over their ribs 14 into the next adjoining grooves 16, often without becoming disengaged from each other.

While the objects of the invention are efficiently achieved by the preferred forms of the invention described in the foregoing specification, the invention also includes changes and variations falling within and between the definitions of the following claims.

I claim:

1. A storage case for substantially identical round disks comprising in combination (A) means including a curved wall forming a cavity, and (B) convex ribs (1) protruding inwardly from and spanning the curved wall and (2) forming between themselves concave grooves lying in parallel planes perpendicular to the axis of the cavity and accommodating the rims of the disks, (C) with the ribs having a minimum radius less than the radius of the disks and the grooves having a maximum radius greater than the radius of the disks, (D) and with the ribs and grooves each being substantially semi-circular and providing stable embracing support for the disks in different orientations of the case.

2. The case defined in claim 1 including a flat outer wall substantially parallel to the parallel planes of the grooves and positioned underlying the cavity and supporting the case when it is resting thereon upon a horizontal surface.

3. The storage case defined in claim 1 wherein the ribs and grooves form semi-circles extending around the curved wall over an angular distance of 180°.

4. The combination of (A) a plurality of round disks all having the same radius R and thickness T and (B) a storage case comprising means including a curved wall forming a semi-cylindrical cavity with inwardly protruding convex ribs (1) having an inside radius less than R and spaced apart by equal distances D not greater than T (2) and forming between themselves semicircular concave grooves having an inside radius greater than R spanning the curved wall perpendicular to the axis of the cavity, each accommodating the rim of one of said round disks.

5. The combination defined in claim 4 wherein the disks are all provided with engageable alignment means including ridges and valleys on their facing juxtaposed surfaces.

6. The combination defined in claim 5 wherein the ridges and valleys form a reversible pattern symmetrical about the axis of each disk interchangeably permitting only aligned concentric engagement of the disks.

7. The combination defined in claim 5 wherein D is substantially less than T, permitting the grooves to receive and accommodate pluralities of disks only when substantially all of the disks have their alignment means engaged.

8. The combination defined in claim 6 wherein the pattern comprises a plurality of radial ridges protruding from the facing surfaces of the disks.

References Cited by the Examiner

UNITED STATES PATENTS

| | | | |
|---|---|---|---|
| 1,402,332 | 1/1922 | Wiehl | 211—40 |
| 1,455,289 | 5/1923 | Heene | 40—27.5 |
| 2,257,891 | 10/1941 | Stokes | 211—49 |

FOREIGN PATENTS

| | | |
|---|---|---|
| 815,004 | 9/1951 | Germany. |

CLAUDE A. LE ROY, *Primary Examiner*.

K. J. WINGERT, *Assistant Examiner*.